June 12, 1923.
M. T. G. WESSON
1,458,506
SPRING SUSPENSION FOR MOTOR CYCLES
Filed March 9, 1920
2 Sheets-Sheet 1
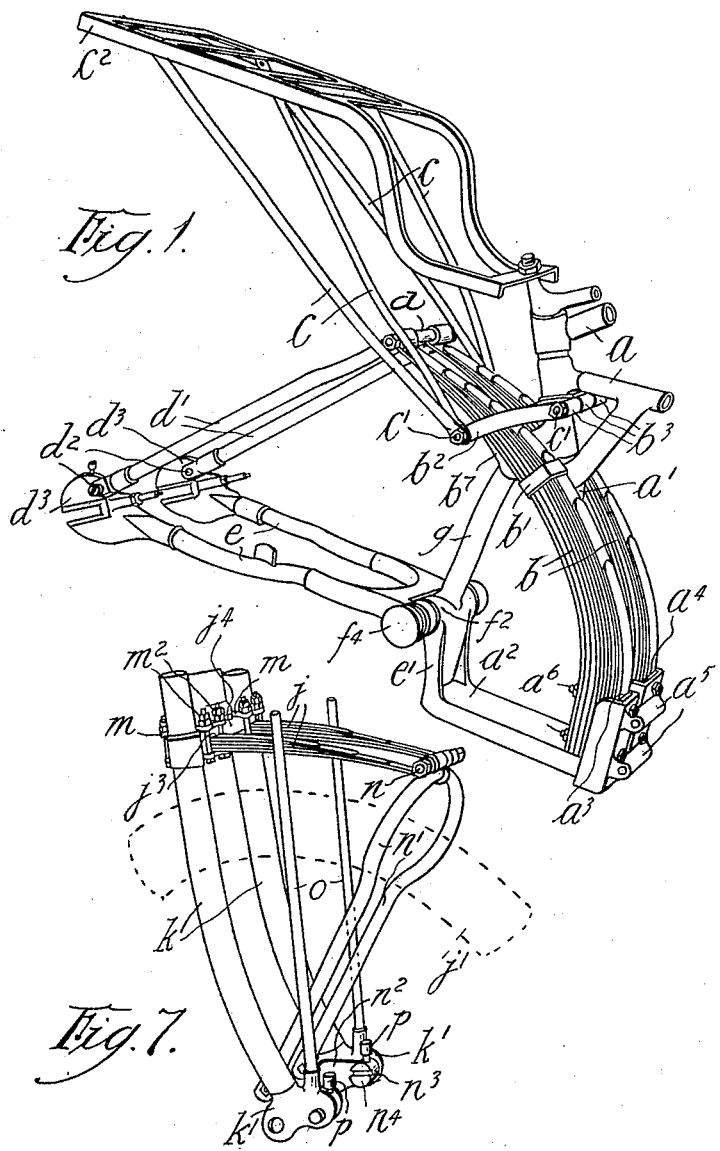
INVENTOR
Maurice Thomas George Wesson
BY
HIS ATTORNEYS

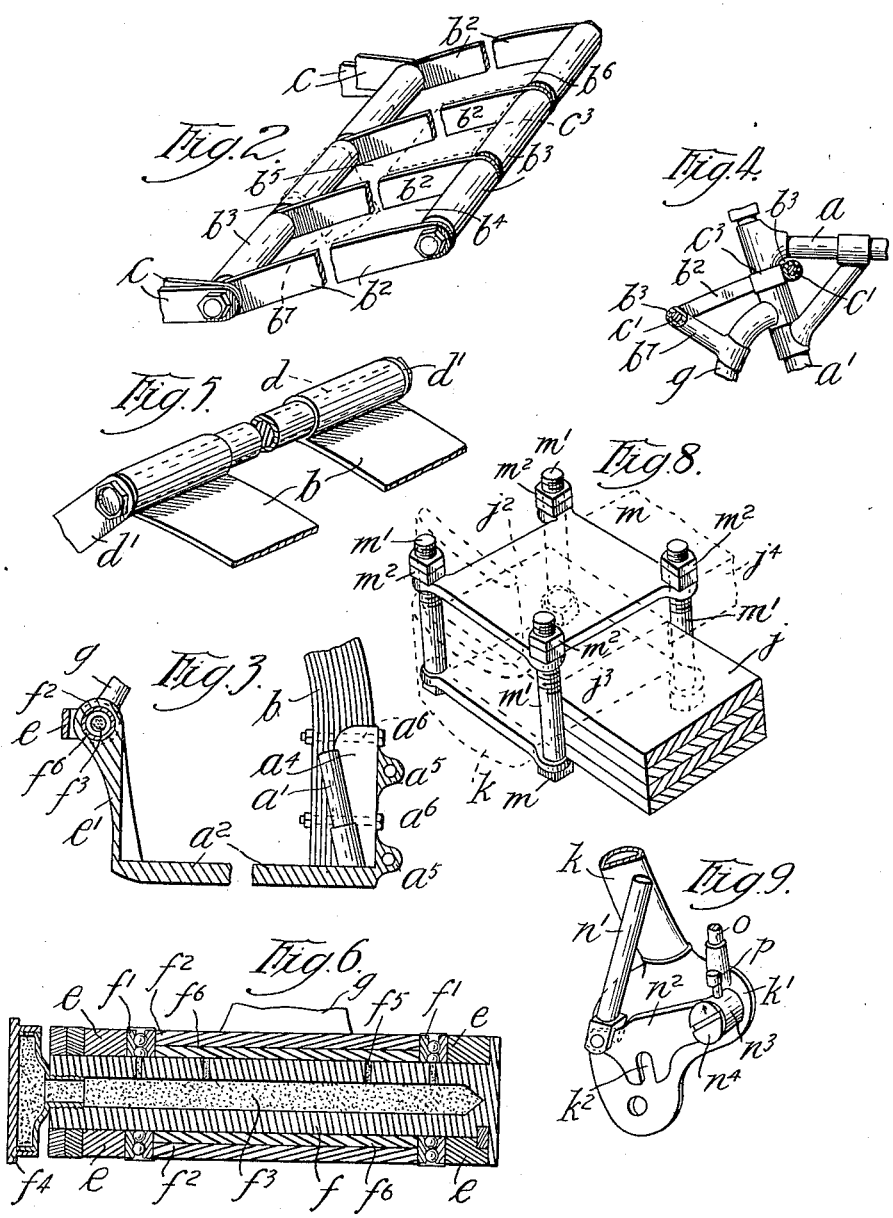

Patented June 12, 1923.

1,458,506

UNITED STATES PATENT OFFICE.

MAURICE THOMAS GEORGE WESSON, OF RICHMOND, MELBOURNE, VICTORIA, AUSTRALIA.

SPRING SUSPENSION FOR MOTOR CYCLES.

Application filed March 9, 1922. Serial No. 542,240.

*To all whom it may concern:*

Be it known that I, MAURICE THOMAS GEORGE WESSON, a subject of the King of Great Britain, residing at 53 Rowena Parade, Richmond, Melbourne, in the State of Victoria, Australia, have invented certain new and useful Improvements in Spring Suspensions for Motor Cycles; and I do declare the following to be a full, clear, and exact description of the invention, such as will enable others skilled in the art to which it appertains to make and use the same.

This invention has been devised to provide improvements in and relating to spring suspension for motor cycles and embraces features whereby the spring frame will be laterally rigid and flexible in action, enabling the unsprung weight of the machine to be reduced to a minimum, and in doing so protect the major portion of the mechanism from road shocks and vibrations, eliminating the many strains to which the machine is subjected thus increasing the comfort of the rider and permitting the maintenance of high speed with safety and comfort. Furthermore the means employed in this invention to retain the spring frame rigid and yet flexible in action permits the employment (of what is considered in this type of spring suspension of motor cycles long springs), this further feature considerably increases the flexibility of the springs thereby greatly adding to the comfort of the rider.

In order that my invention may be the more easily understood reference will be made to the accompanying sheets of drawings in which—

Fig. 1 is a general view showing the rear spring suspension hereinafter described.

Fig. 2 is an enlarged view of guides hereinafter referred to.

Fig. 3 illustrates a section of a cradle (gear box platform) which forms a holding base for the lower ends for two quarter elliptic springs and a pillar of the frame.

Fig. 4 is a sectional view showing the guides in position on the frame.

Fig. 5 is an enlarged view illustrating the manner of connecting the springs to the rear forks of the machine.

Fig. 6 illustrates in section a bearing hereinafter described.

Fig. 7 illustrates the front spring suspension the mechanism of which operates in conjunction with the rear spring suspension to accomplish the purpose hereinbefore referred to.

Fig. 8 is an enlarged view illustrating the manner of attaching each respective spring of the front suspension arrangement whilst Fig. 9 illustrates drawn to a large scale a lever and its parts hereinafter referred to.

In the accompanying drawings $a$ is a frame of a motor cycle, the lower end of the pillar $a^1$ of such frame $a$ is provided with a holding base consisting of a cradle $a^2$ forming the gear box platform. The post $a^1$ is disposed in a central position, i. e. between two vertical channels $a^3$ and $a^4$ integral with the said cradle $a^2$ and provided at their rear with lugs $a^5$ for bolts (not shown) referring to the fixing in position of the engine. Disposed and fixed by bolts $a^6$ within each of such channels forming an anchoring base is the pillar end of a quarter elliptic spring $b$ with a stiffening ring $b^1$. To ensure a lateral, rigid, and yet flexible effect in action, the springs are passed through and neatly fitted in guides comprising plates $b^2$ of a required curve bolted together and separated by sleeves $b^3$ to form preferably three compartments $b^4$, $b^5$ and $b^6$, each spring being disposed in the respective outer compartment $b^4$ and $b^6$. The whole structure i. e. the three guides are rigidly maintained in the desired position by an arrangement comprising a block $c^3$ disposed in the central compartment of the guides and integral with the pillar $a^1$ of the frame $a$, and a pillar $b^7$ one end of which is brazed to the rear stationary sleeve $b^3$ of the compartment forming the central guide, the lower end of the said pillar $b^7$ being brazed to the post $g$ hereinafter referred to.

The guide plates $b^2$ are held together by diagonal rods $c$ bolted to the outer ends of the horizontal bolt $c^1$ at each side of the compartments $b^4$ and $b^6$, the outer ends of such rods being fixed to the frame $c^2$ forming the auxiliary seat of the machine. This arrangement provides an additional means for supporting and retaining the guides in their rigid position before stated. Each spring $b$ is fastened at its upper or outer end (to allow a required movement) to a bolt $d$ supported by the rear forks $d^1$ whose lower ends are hinged to bearing pins $d^2$ of the rear bifurcated plates $d^3$. Integral with the latter are the chain or rear stay bars $e$ connected at their other end to a pivotal bearing mounted at the top of the vertical web-piece $e^1$ forming part of the cradle $a^2$, such bearing comprises (see Fig. 6) a king bolt $f$ with thrust ball races $f^1$; such bolt $f$ is keyed to the ends of the chain stays $e$ and is provided with an internal lubricating reservoir $f^3$ with screw cap $f^4$, the lubricant feeding through holes $f^5$ to a phosphor bronze brush $f^6$ enclosed in bracket $f^2$. To increase the rigidity of the post $a^1$ and also form a supporting and holding means for the pillar $b^7$ I provide a tubular post $g$ positioned at the rear of the pillar $a^1$ the lower end of the post $g$ being brazed to the bracket $f^2$ aforesaid, and the upper end brazed to the pillar $a^1$ below the guides and in contact with and supporting the block $c^3$.

Referring to the front spring suspension, each of the springs $j$ when in position will lie at each side of the wheel $j^1$, their inner ends $j^2$ being held (see Fig. 8) in a recess $j^3$ provided in the ribbed plate $j^4$ under the steering head of the machine and integral with both forks $k$ above the wheel $j^1$. Each of the inner ends $j^2$ of the spring are held by a clamp comprising plates $m$, bolts $m^1$ and nuts $m^2$. Each spring $j$ extends outwardly for some distance where they are connected to a bolt $n$ attached to the suspension fork $n^1$, the upper curved portion of which surrounds the rim of the wheel $j^1$ and proceeds diagonally and downwardly to a position adjacent to the end of the front forks $k$ of the machine. Each member of the suspension fork $n^1$ at its lower end is bifurcated (see Fig. 9) and is hinged to a lever arm $n^2$ integral with the movable sleeve $n^3$ on a horizontal screw-pin portion $n^4$ fixed to the plate $k^1$ at the bottom of the fork $k$. The axle (not shown) of the front wheel reposes in the slot $k^2$ provided in the plate $n^2$. The usual stay bars $o$ are provided to add rigidity to the front forks $k$ and convenient oil cups $p$ are disposed where required.

It will be seen that when the rear wheel receives a road shock to cause a vertical periodicity the outer ends of the hinged chain or rear stays will move vertically and radially causing the hinged rear forks to make an upward movement simultaneously taking a diagonal direction. This action raises the ends of both springs so that the full elasticity of both springs over the entire length is brought at the same time into play, during which each spring remains laterally rigid. On the front wheel receiving a road shock the axle will move radially and upwardly causing both of the hinged levers to make the same movement compelling both members of the suspension fork to move upwardly and radially and in doing so raise the outer ends of both springs to obtain the identical effect described above in connection with the rear springs.

I claim:

1. In a motor and similar cycles, a horizontal frame bar, a part depending therefrom, a cradle member at the lower end of the depending part, stay bars pivotally connected at corresponding ends to the rear end of the cradle and adapted at the their other ends to receive the axle of a wheel, forks pivotally connected at corresponding ends to the free ends of the stay bars, and springs fixed at one end in the front end of the cradle member and at their other ends pivotally connected to the other ends of the said forks.

2. In a motor and similar cycles, a horizontal frame bar, a bar depending therefrom, a U-shaped cradle at the lower end of the depending bar, stay bars pivotally connected at corresponding ends at one end of the cradle member and adapted at their other ends to receive the axle of a wheel, forks pivotally connected at corresponding ends to the free ends of the stay bars, and springs fixed at one end in the other end of the cradle member and at their other ends pivotally connected to the other ends of the forks.

3. In a motor and similar cycles, a horizontal frame bar, a bar depending therefrom, a U-shaped cradle at the lower end of the depending bar, stay bars pivotally connected at corresponding ends to one end of the cradle member and adapted at their opposite ends to receive the axle of a wheel, forks pivotally connected at corresponding ends to the free ends of the stay bars, springs fixed at one end in the other end of the cradle member and at their other ends pivotally connected to the other ends of the forks, and guide members associated with the depending bar and through which the springs pass to prevent lateral movement thereof.

4. In a motor and similar cycles, a horizontal frame bar, a bar depending therefrom, a U-shaped cradle at the lower end of the depending bar, stay bars pivotally connected at corresponding ends to one end of the cradle member and adapted at their opposite ends to receive the axle of a wheel, forks pivotally connected at corresponding ends to the free ends of the stay bars, springs fixed at one end in the other end of the cradle member and at their other ends pivotally connected to the other ends of the forks, guide members associated with the depending bar and through which the springs pass to prevent lateral movement thereof, a seat frame, and brace rods extending between the seat frame and the guides.

5. In a motor and similar cycles, a horizontal frame bar, a bar depending therefrom, a cradle, a hollow bolt passing through an end portion of the cradle, stay bars pivotally mounted on the hollow bolt, bearings associated with the pivotally mounted ends of the stay bars and the hollow bolt, the stay bars at their opposite or free ends being adapted to receive the axle of a wheel, fork members pivotally connected at corresponding ends to the free ends of the stay bars, and springs secured at one end in the cradle member and pivotally connected at their other ends in the other ends of the forks.

In testimony whereof I have signed my name to this specification in the presence of two subscribing witnesses.

MAURICE THOMAS GEORGE WESSON.

Witnesses:
AUGUSTINE S. MADDEN,
IVY DONOHUE.